(12) United States Patent
Agarwal et al.

(10) Patent No.: US 9,365,348 B1
(45) Date of Patent: Jun. 14, 2016

(54) ITEM RETRIEVAL USING A ROBOTIC DRIVE UNIT

(71) Applicant: Amazon Technologies, Inc., Seattle, WA (US)

(72) Inventors: Rishabh Agarwal, Allahabad (IN); Venkataramanan Subramanian, Hyderabad (IN); Mustafa Mustansir Hussain, Hyderabad (IN); Ahmed Shareef, R.R. District (IN); Vikas Vishwanatham, Nizamabad (IN)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/656,061

(22) Filed: Mar. 12, 2015

Related U.S. Application Data

(63) Continuation of application No. 14/036,069, filed on Sep. 25, 2013, now Pat. No. 9,002,506.

(51) Int. Cl.
*G06F 7/00* (2006.01)
*B65G 1/137* (2006.01)

(52) U.S. Cl.
CPC .................................... *B65G 1/137* (2013.01)

(58) Field of Classification Search
USPC ........................................................ 700/216
See application file for complete search history.

(56) References Cited

U.S. PATENT DOCUMENTS

| | | | |
|---|---|---|---|
| 8,266,017 B1 | 9/2012 | Dearlove et al. | |
| 2008/0051984 A1* | 2/2008 | Wurman | G06Q 10/08 701/532 |
| 2008/0075567 A1* | 3/2008 | Di Rosa | B65G 63/065 414/266 |
| 2009/0185884 A1* | 7/2009 | Wurman | B65G 1/1378 414/270 |
| 2010/0262278 A1 | 10/2010 | Winkler | |
| 2010/0316469 A1* | 12/2010 | Lert | B65G 1/045 414/273 |
| 2010/0316470 A1* | 12/2010 | Lert | B65G 1/045 414/273 |

\* cited by examiner

*Primary Examiner* — Kyle Logan
(74) *Attorney, Agent, or Firm* — Thomas | Horstemeyer, LLP

(57) ABSTRACT

Disclosed are various embodiments that may facilitate items being retrieved from a storage location. A robotic drive unit transports a carrier storage unit to be proximate to a target storage unit that comprises a container in which an item is located. The robotic drive unit aligns a receptacle in the carrier storage unit with the container in the target storage unit. The container is transferred from the target storage unit to the carrier storage unit. The robotic drive unit transports the carrier storage unit with the container to a destination.

20 Claims, 11 Drawing Sheets

ITEM RETRIEVAL USING A ROBOTIC DRIVE UNIT

CROSS-REFERENCE TO RELATED APPLICATION

This application is a continuation of and claims priority to U.S. application Ser. No. 14/036,069, entitled "Item Retrieval Using a Robotic Drive Unit," filed Sep. 25, 2013, which is incorporated by reference herein in its entirety.

BACKGROUND

Items can be stored in a warehouse environment. For example, an item can be stored in a fulfillment center to await an order being placed for the purchase of the item. In response to the order being placed, a human worker may retrieve the item from its storage location and prepare the item for shipment. To this end, the human worker may walk to the storage location, transport the item to a shipping preparation station, and package the item using a suitable shipping container.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure is directed towards facilitating the retrieval of one or more items being stored in, for example, a warehouse environment, such as an order fulfillment center. A fulfillment center is a site in which items are stored to be shipped to customers in fulfillment of orders generated, for example, through an electronic commerce system. According to various embodiments, multiple items may be stored in containers that are located in storage units in the fulfillment center. A storage unit may be, for example, a rack that has several receptacles in which the containers may be located. Additionally, several robotic drive units may operate within the fulfillment center. The robotic drive units may be configured to pick up and carry the storage units to thereby move the containers and items that are located in the storage units. According to various embodiments of the present disclosure, an item may be retrieved in response to an order to purchase the item being generated through an electronic commerce system. To this end, a robotic drive unit may move a first storage unit so that the first storage unit is proximate to a second storage unit where the ordered item is located. The position of the first storage unit and/or the second storage unit can be adjusted so that an empty receptacle in the first storage unit is aligned with the container in which the ordered item is located. The container can then be transferred from the second storage unit to the first storage unit. For example, the first storage unit may pull the container into the empty receptacle, or the second storage unit may push the container into the empty receptacle. The robotic drive unit may then move the first storage unit to other storage units, and additional containers with other ordered items may be transferred into empty receptacles in the first storage unit. At some point, the robotic drive unit may carry the first storage unit to a shipping preparation station where the ordered items are retrieved from the containers stored therein. Thereafter, the items may be packaged and prepared for shipment in fulfillment of the orders. In the following discussion, a general description of the system and its components is provided, followed by a discussion of the operation of the same.

Figure 1:
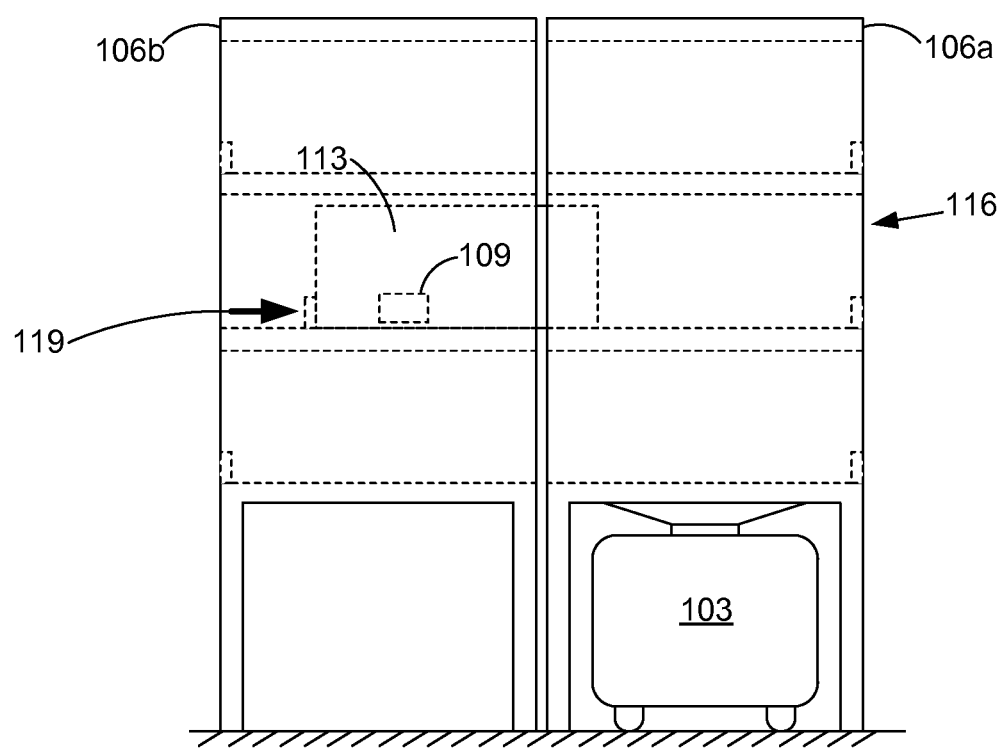
FIG. 1 is a pictorial diagram representing an example of a container being transferred from a target storage unit to a carrier storage unit according to various embodiments of the present disclosure.

With reference to FIG. 1, shown is a non-limiting example of a scenario in which a robotic drive unit 103 has been used to transport a carrier storage unit 106a to a target storage unit 106b in a fulfillment center or other type of materials handling facility. The robotic drive unit 103 has aligned an empty receptacle 116 in the carrier storage unit 106a with a container 113 that is located in the target storage unit 106b. The container 113 holds one or more items 109 that are being stored. After the empty receptacle 116 has been aligned with the container 113, as shown, the container 113 is transferred to the receptacle 116 in the carrier storage unit 106a, as indicated by the arrow 119. Thereafter, the robotic drive unit 103 may transport the carrier storage unit 106a with the container 113 to a subsequent target storage unit 106b.

Another receptacle 116 in the carrier storage unit 106a can then be aligned with another container 113 in the subsequent target storage unit 106b, and this container 113 may be transferred from the subsequent target storage unit 106b to the receptacle 116 in the carrier storage unit 106a. This process can be repeated until all of the receptacles 116 in the carrier storage unit 106a are occupied by containers 113. The robotic drive unit 103 may then transport the carrier storage unit 106a to a shipping preparation station where items 109 are accessed for shipment in fulfillment of orders.

Figure 2:
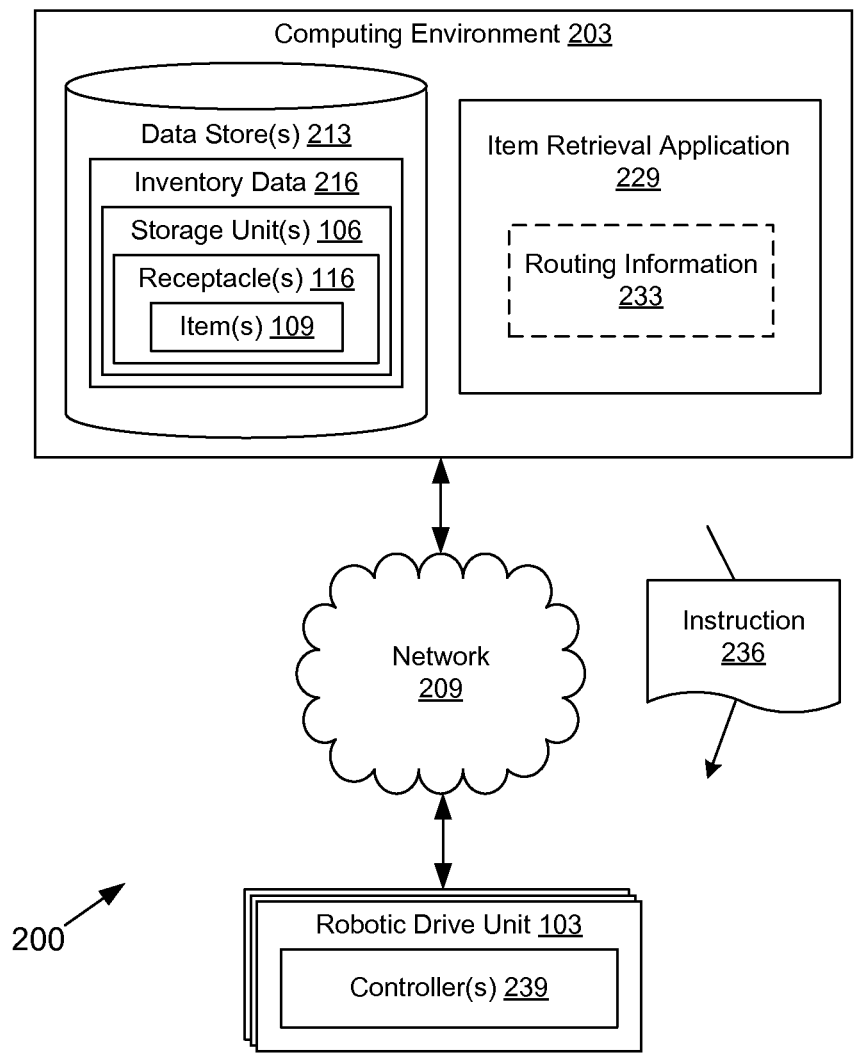
FIG. 2 is a drawing of a networked environment according to various embodiments of the present disclosure.

Thus, several containers 113 holding several items 109 may be transported by the robotic drive unit 103 to the shipping preparation station in a single trip. The items 109 may then be packed and shipped. With reference to FIG. 2, shown is a networked environment 200 according to various embodiments. The networked environment 200 includes a computing environment 203 and one or more robotic drive units 103 that are in data communication via a network 209. The network 209 may comprise, for example, the Internet, an intranet, an extranet, a wide area network (WAN), a local area network (LAN), a wired network, a wireless network, any other suitable network, or any combination of two or more such networks. For example, such networks may comprise one or more satellite networks, cable networks, Ethernet networks, and/or other types of networks.

The computing environment 203 may comprise, for example, a server computer or any other system providing computing capability. Alternatively, the computing environment 203 may employ a plurality of computing devices that may be arranged, for example, in one or more server banks, computer banks, or other arrangements. Such computing devices may be located in a single installation or may be distributed among multiple geographical locations. For example, the computing environment 203 may include a plurality of computing devices that together comprise a hosted computing resource, a grid computing resource, and/or any other distributed computing arrangement. In some cases, the computing environment 203 may correspond to an elastic computing resource where the allotted capacity of processing, network, storage, and/or other computing-related resources may vary over time.

Various applications and/or other functionality is executed in the computing environment 203 according to various embodiments. Also, various data is stored in a data store 213 that is accessible to the computing environment 203. The data store 213 may be representative of a plurality of data stores 213. The data stored in the data store 213, for example, is associated with the operation of the various applications and/or functional entities described below.

The data stored in the data store 213 includes, for example, inventory data 216 and potentially other data. The inventory data 216 comprises information related to the items 109 that are being accounted for by the computing environment 203. Such items 109 may be, for example, physical goods that are being stored, that are expected to be stored, or that have previously been stored and accounted for by the data store 213. In various embodiments, the items 109 may be available for purchase, rental, lease, trade, etc., using an electronic commerce system that is associated with the computing environment 203.

In some embodiments, the items 109 may be stored in containers 113 (FIG. 1). A container 113 may be, for example, a plastic bin that has an opening through which a human worker or robotic arm can access an item 109. One or more items 109 may be stored in each one of the containers 113 according to various embodiments.

The inventory data 216 may include data that represents one or more storage units 106 where one or more of the items 109 can be located. A storage unit 106 in various embodiments may be, for example, a physical structure, such as a rack, on which one or more items 109 and/or containers 113 can be stored. Each storage unit 106 may be configured to operate as a carrier storage unit 106a and/or a target storage unit 106b.

Additionally, a storage unit 106 may comprise one or more receptacles 116. A receptacle 116 can be regarded as being an identifiable location within a storage unit 106 where one or more containers 113 and/or items 109 can be located. Thus, in various embodiments, the inventory data 216 may include information that identifies the particular receptacles 116 of the particular storage units 106 where the particular containers 113 and/or items 109 are located.

The components executed on the computing environment 203 include, for example, an item retrieval application 229 and/or other applications, services, processes, systems, engines, or functionality not discussed in detail herein. The item retrieval application 229 may be executed to, for example, oversee the storage and retrieval of the items 109. As such, the item retrieval application 229 may also control one or more robotic drive units 103. For instance, the item retrieval application 229 in various embodiments may generate routing information 233 and/or other types of data. Such routing information 233 may determine the particular movement that a robotic drive unit 103 is to perform in order to, for example, retrieve one or more of the items 109. The routing information 233 in various embodiments may also be responsive to obstructions that exist in the environment where the robotic drive units 103 operate. For instance, the routing information 233 for a particular robotic drive unit 103 may be responsive to the expected travel of other robotic drive units 103 so that a collision may be avoided.

The item retrieval application 229 may also track the items 109 as they are moved within the environment being monitored by the item retrieval application 229. For instance, the item retrieval application 229 may update the inventory data 216 from time to time and/or whenever an item 109 is moved.

The item retrieval application 229 may also generate and transmit instructions 236 for the robotic drive units 103. An instruction 236 for a particular robotic drive unit 103 may, for example, instruct the robotic drive unit 103 to travel to a particular location, perform one or more specified maneuvers, or execute any other type of specified function. Additionally, an instruction 236 may be transmitted to a storage unit 106, where the instruction 236 is received and processed by a receiver for the storage unit 106. Such an instruction 236 for the storage unit 106 may, for example, specify a particular movement or maneuver that a component on the storage unit 106 is to perform.

Each robotic drive unit 103 may be a vehicle that is configured to transport various objects. For example, a robotic drive unit 103 may be configured to transport a storage unit 106 or other types of objects. The robotic drive unit 103 may be powered by, for example, an on-board battery, an internal combustion engine, or any other suitable power source.

Each robotic drive unit 103 may comprise one or more controllers 239. A controller 239 may be configured to process data and cause the robotic drive unit 103 to perform various functions. For example, a controller 239 may receive an instruction 236 from the item retrieval application 229, process data corresponding to the instruction 236, and cause the robotic drive unit 103 to perform movement in accordance with the instruction 236 that was received.

Figure 3:
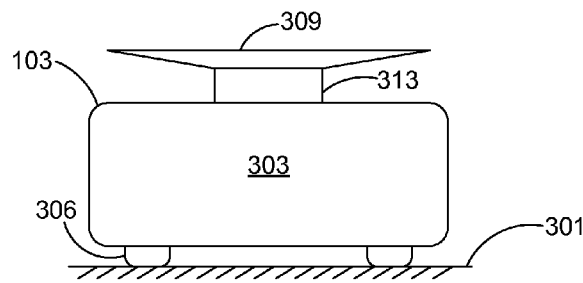
FIG. 3 is a pictorial diagram representing a robotic drive unit in the networked environment of FIG. 1 according to various embodiments of the present disclosure.

With reference to FIG. 3, shown is a drawing representing a robotic drive unit 103 according to various embodiments of the present disclosure. In particular, FIG. 3 shows a side view of a robotic drive unit 103 relative to the floor 301. The robotic drive unit 103 shown in FIG. 3 is configured to transport a carrier storage unit 106a (FIG. 1) by positioning itself under a portion of the carrier storage unit 106a and then carrying the carrier storage unit 106a. To this end, the robotic drive unit 103 may comprise, for example, a body 303, multiple wheels 306, a platform 309, an elevator 313, and/or other components.

The body 303 may be a portion of the robotic drive unit 103 that houses, for example, the controller 239 (FIG. 2), a motor, and/or other components that facilitate the operation of the robotic drive unit 103. The wheels 306 may be coupled to a motor to facilitate the movement of the robotic drive unit 103 along the floor 301. The platform 309 is configured to be positioned under a portion of a carrier storage unit 106a to facilitate carrying the carrier storage unit 106a. The elevator 313 is attached to the platform 309 and a motor, an actuator, or any other suitable mechanism that is configured to cause the elevator 313 to be extended out and retracted into the body 303. In turn, the platform 309 may be raised and lowered vertically with respect to the floor 301.

Figure 4A:
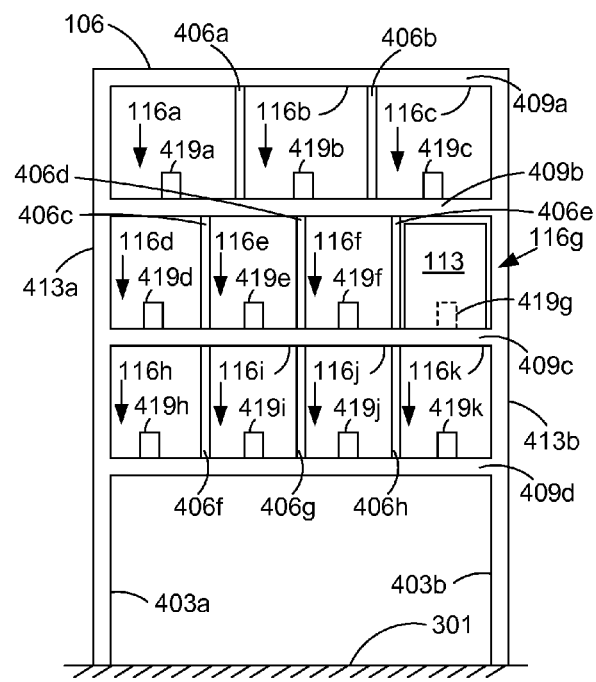
FIGS. 4A-4B are pictorial diagrams representing a storage unit in the networked environment of FIG. 1 according to various embodiments of the present disclosure.
Figure 4B:
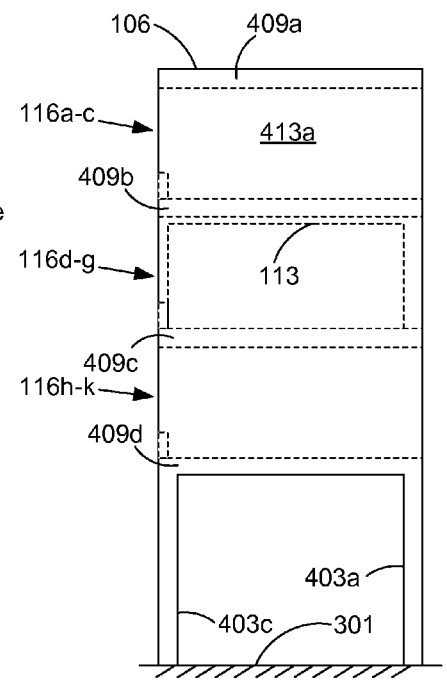

With reference to FIGS. 4A-4B, shown is a drawing representing a storage unit 106 according to various embodiments. In particular, FIG. 4A shows a front view of the storage unit 106, and FIG. 4B shows a side view of the storage unit 106. The storage unit 106 shown in FIGS. 4A-4B can be used as a carrier storage unit 106a and/or a target storage unit 106b.

The storage unit 106 may comprise, for example, legs 403a-403d (leg 403d is visible in FIG. 5A), dividers 406a-406h, shelves 409a-409d, side walls 413a-413b, and potentially other components. The legs 403a-403d may support various components of the storage unit 106 and maintain the storage unit 106 in an upright position as shown in FIGS. 4A-4B.

Additionally, the storage unit 106 may comprise multiple receptacles 116, referred to herein as the receptacles 116a-116k. Containers 113 can insert into the receptacles 116a-116k. For example, FIGS. 4A-4B show a container 113 that has been inserted into the receptacle 116g. As shown, the dividers 406a-406h and/or the side walls 413a-413b may define the horizontal dimensions and positions of the receptacles 116a-116k with respect to the storage unit 106. For example, the horizontal dimension and position of the receptacle 116a is defined by the position of the side wall 413a and the divider 406a, and the horizontal dimension and position of the receptacle 116i is defined by the divider 406f and the divider 406g.

In various embodiments, the positions of the dividers 406a-406h may be adjustable. To this end, the dividers 406a-406h may be coupled to, for example, one or more motors or actuators that adjust the respective positions of the dividers 406a-406h along the shelves 409a-409d. Thus, the positions and/or dimensions of the receptacles 116a-116k may be adjusted to receive containers 113 that have various dimensions. For example, the dimensions of a container 113 may be known or be identified, and the dimensions of a receptacle 116a-116k may be adjusted responsive to the dimensions of the container 113.

The vertical dimensions and positions of the receptacles 116a-116k may be defined by the positions of the shelves 409a-409d. For example, the vertical dimension and position of the receptacle 116a is defined by the shelf 409a and the shelf 409b, and the vertical dimension and position of the receptacle 116i is defined by the shelf 409c and the shelf 409d.

The storage unit 106 may also comprise container movers 419a-419k. Each of the container movers 419a-419k may be configured to push a container 113 out of the corresponding one of the receptacles 116a-116k and into, for example, one of the receptacles 116a-116k in another storage unit 106. To this end, the container movers 419a-419k may be coupled to, for example, one or more motors, actuators, or any other type of suitable driving mechanism that can cause the container movers 419a-419k to move containers 113 out the receptacles 116a-116k. In various embodiments, the container movers 419a-419k may be embodied in the form of, for example, arms, levers, or any other component that can move a container 113.

The storage unit 106 may be attached to a battery or other type of power supply that provides power for the movement of the container movers 419a-419k and for other operations performed by the storage unit 106. In alternative embodiments, the storage unit 106 may be electrically coupled to a robotic drive unit 103 (FIG. 1) to receive electrical power provided by the power source for the robotic drive unit 103.

Next, a general description of the operation of the various components of the networked environment 200 (FIG. 2) is provided. The following discussion assumes that items 109 (FIG. 1) are being stored in containers 113 (FIG. 1) that are located in various receptacles 116 (FIG. 1) of at least some of storage units 106. Additionally, it is assumed that there is a carrier storage unit 106a (FIG. 1) that has several empty receptacles 116 available to receive containers 113. Furthermore, in the following discussion it is assumed that a robotic drive unit 103 (FIG. 3) is positioned to transport the carrier storage unit 106a. For example, the robotic drive unit 103 may be positioned under a portion the carrier storage unit 106a so that the carrier storage unit 106a can ride on the platform 309 (FIG. 3) of the robotic drive unit 103.

The item retrieval application 229 (FIG. 2) may receive data representing a request to retrieve a particular item 109. For example, a customer interacting with an electronic commerce system may have previously placed an order to purchase an item 109. After the order has been placed by the customer, the electronic commerce system may transmit a request for the item retrieval application 229 to cause the item 109 to be retrieved and to have the item 109 prepared for shipment.

In response to the item retrieval application 229 receiving the request to retrieve a specified item 109, the item retrieval application 229 may identify the location of the item 109 within the environment in which it is stored. To this end, the item retrieval application 229 may identify the target storage unit 106b (FIG. 1) that has the item 109 to be retrieved. Furthermore, the item retrieval application 229 may identify the particular receptacle 116 of the target storage unit 106b where the container 113 holding the item 109 is located. With the particular target storage unit 106b and receptacle 116 identified, the item retrieval application 229 may identify the location of the target storage unit 106b and/or the receptacle 116 within the storage environment. For instance, the location may be represented in the form of coordinates or any other sort of reference that can be used to identify a location in the environment where the item 109 is stored.

With the location of the target storage unit 106b known to the item retrieval application 229, the item retrieval application 229 may determine the routing information 233 (FIG. 2) so that a robotic drive unit 103 can transport the carrier storage unit 106a to the target storage unit 106b. For example, the item retrieval application 229 may use the current location of the robotic drive unit 103 and/or the carrier storage unit 106a as the start point and the location of the target storage unit 106b as the end point for the travel path. The item retrieval application 229 may also take the movement of other robotic drive units 103 and/or other obstructions when determining the routing information 233. Using the determined start point and end point, the item retrieval application 229 may determine a path for the robotic drive unit 103 to travel and may store this data as the routing information 233.

With the routing information 233 determined, the item retrieval application 229 may generate and transmit instructions 236 (FIG. 2) to the robotic drive unit 103 to cause the robotic drive unit 103 to transport the carrier storage unit 106a to the target storage unit 106b. In some embodiments, the instructions 236 that are transmitted may include a command instructing the robotic drive unit 103 to move the carrier storage unit 106a to a specified location, and the robotic drive unit 103 can autonomously guide itself to the location using the command. In other embodiments, the item retrieval application 229 may transmit instructions 236 that progressively guide the robotic drive unit 103 to the location of the target storage unit 106b. Such progressive instructions 236 may specify, for example, when and/or where the robotic drive unit 103 is to perform turns and or any other type of maneuver to arrive at the determined location.

The robotic drive unit 103 may transport the carrier storage unit 106a to the target storage unit 106b. To this end, the platform 309 for the robotic drive unit 103 may be positioned under a portion of the carrier storage unit 106a, and the elevator 313 (FIG. 3) may be extended to lift the carrier storage unit 106a off the floor. With the carrier storage unit 106a lifted off the floor, the carrier storage unit 106a can ride on top the robotic drive unit 103 to the target storage unit 106b. In alternative embodiments, the robotic drive unit 103 can push, pull, and/or transport the carrier storage unit 106a in other ways.

The robotic drive unit 103 may transport the carrier storage unit 106a so that it is proximate to the target storage unit 106b. In this regard, the carrier storage unit 106a may contact the target storage unit 106b, or there may be a relatively small spacing between the carrier storage unit 106a and the target storage unit 106b.

Additionally, the robotic drive unit 103 may align a receptacle 116 of the carrier storage unit 106a with the container that holds the item 109 in the target storage unit 106b. In this sense, the receptacle 116 of the carrier storage unit 106a may be positioned such that the container 113 can be transferred from the target storage unit 106b to the carrier storage unit 106a. For example, the receptacle 116 of the carrier storage unit 106a may be at the same vertical level as the container 113 and/or the item 109 in the target storage unit 106b.

The carrier storage unit 106a may comprise one or more sensors that can be used to determine whether the empty receptacle 116 in the carrier storage unit 106a is aligned with the container in the target storage unit 106b. For example, such a sensor may be located on the carrier storage unit 106a and be configured to detect light, a barcode, or any other suitable indicator on the container 113 or the target storage unit 106b to signal to the item retrieval application 229 and/or the robotic drive unit 103 when the desired alignment has been achieved. In alternative embodiments, the robotic drive unit 103 may merely move the carrier storage unit 106a a predetermined horizontal and/or vertical distance with respect to the target storage unit 106b to cause the container 113 and the empty receptacle 116 to be aligned with respect to each other.

According to various embodiments, the receptacle 116 in the carrier storage unit 106a can be aligned with the container 113 in the target storage unit 106b by performing various types of maneuvers. For example, the robotic drive unit 103 can move the carrier storage unit 106a horizontally and/or vertically with respect to the target storage unit 106b so that the receptacle 116 and the container are aligned. Additionally or alternatively, there may be another robotic drive unit 103 that moves the target storage unit 106b horizontally and/or vertically with respect to the carrier storage unit 106a so that the receptacle 116 is aligned with the container 113 in the target storage unit 106b.

When the receptacle 116 in the carrier storage unit 106a is aligned with the container 113 in the target storage unit 106b, the container 113 may be transferred from the target storage unit 106b to the receptacle 116 in the carrier storage unit 106a. For example, one of the container movers 419a-419k (FIG. 4A) may move the container 113 into a receptacle 116 in the carrier storage unit 106a. Alternatively or additionally, the carrier storage unit 106a may comprise container movers 419a-419k that, for example, push or pull a container 113 into the receptacle 116 in the carrier storage unit 106a.

In some embodiments, another robotic drive unit 103 may be outfitted with a plate, arm, lever, or other suitable type of component that contacts the container in the target storage unit 106b and moves with respect to the carrier storage unit 106a, thereby transferring the container 113 from the target storage unit 106b into the receptacle 116 in the carrier storage unit 106a. Furthermore, the receptacle 116 in the carrier storage unit 106a and/or a receptacle 116 in the target storage unit 106b may comprise one or more conveyors, such as a passive conveyor, a driven conveyor, a belt conveyor, a roller conveyor, or any other type of conveyor system that facilitates the container 113 being moved from the target storage unit 106b to the carrier storage unit 106a.

Additionally or alternatively, the receptacle 116 in the target storage unit 106b may comprise a floor that tilts when the receptacle 116 in the carrier storage unit 106a is aligned with the container 113 in the target storage unit 106b. As a result of the floor of the receptacle 116 in the target storage unit 106b being titled, the container may, for example, slide from the target storage unit 106b into the receptacle 116 in the carrier storage unit 106a.

In some embodiments, the carrier storage unit 106a and/or the target storage unit 106b may comprise one or more sensors that can detect whether the container 113 has been transferred from the target storage unit 106b to the carrier storage unit 106a. For instance, the target storage unit 106b may comprise a sensor configured to detect when the container 113 is no longer in the target storage unit 106b, and/or the carrier storage unit 106a may comprise a sensor configured to detect when the container 113 is in the receptacle 116 in the carrier storage unit 106a.

Once the container 113 has been transferred into the receptacle 116 in the carrier storage unit 106a, the container 113 may be restricted from moving with respect to the carrier storage unit 106a. For example, a door for the receptacle 116 in the carrier storage unit 106a may be closed to restrict movement of the container 113 with respect to the carrier storage unit 106a. Additionally or alternatively, a latch may be actuated so that it engages the container 113 to restrict movement of the container 113 within the receptacle 116 of the carrier storage unit 106a. By restricting the movement of the container 113 with respect to the carrier storage unit 106a, the container 113 may be prevented from unintentionally falling off the carrier storage unit 106a when the carrier storage unit 106a is transported by the robotic drive unit 103.

After the container 113 has been transferred into the receptacle 116 in the carrier storage unit 106a, the robotic drive unit 103 may prepare to transport the carrier storage unit 106a to another location. For instance, if the robotic drive unit 103 had previously raised the carrier storage unit 106a to align the receptacle 116 with the container 113 in the target storage unit 106b, the robotic drive unit 103 may lower the carrier storage unit 106a to be in a configuration in which the carrier storage unit 106a can be transported.

The item retrieval application 229 may also determine the next destination for the robotic drive unit 103 and/or the carrier storage unit 106a. The next destination may be, for example, another storage unit 106, a station where a human worker and/or a robotic device remove items 109 from containers 113, or any other location where the robotic drive unit 103 and/or the carrier storage unit 106a may travel. To this end, the item retrieval application 229 may use the current location of the robotic drive unit 103 and/or the carrier storage unit 106a as the start point and the location of the next destination as the end point for the travel path.

The item retrieval application 229 may receive another request to retrieve another item 109. In response, the item retrieval application 229 may generate the routing information 233 and transmit one or more instructions 236 to retrieve the item 109, similar to as described above. Furthermore, the process described above for transporting the carrier storage unit 106a and transferring a container into a receptacle 116 in a carrier storage unit 106a may be repeated. As such, several containers storing one or more items 109 may be transferred onto the carrier storage unit 106a until no more receptacles 116 in the carrier storage unit 106a are available for an additional container.

When no more receptacles 116 are available for an additional container, the item retrieval application 229 may generate routing information 233 and transmit one or more instructions 236 for the robotic drive unit 103 to transport the carrier storage unit 106a to, for example, a station where a human worker or robotic device retrieve specified items 109 from the respective containers that have been transported aboard the carrier storage unit 106a.

After the specified items 109 have been removed from the containers 113, the item retrieval application 229 may generate routing information 233 and transmit one or more instructions 236 for the robotic drive unit 103 to transport the carrier storage unit 106a to another destination. In some embodiments, the robotic drive unit 103 may transport the carrier storage unit 106a to be among other storage units 106 and to operate thereafter as a target storage unit 106b.

In alternative embodiments, the item retrieval application 229 may generate routing information 233 and transmit one or more instructions 236 to cause the containers 113 and items 109 therein to be returned to their previous receptacles 116 of the respective target storage units 106b. To this end, the robotic drive unit 103 may, for example, transport the carrier storage unit 106a to a specified target storage unit 106b and align the container 113 in the carrier storage unit 106a with the receptacle 116 in the target storage unit 106b. Thereafter, a plate or other component in the target storage unit 106b and/or the carrier storage unit 106a may move a container 113 from the carrier storage unit 106a to a receptacle 116 in the target storage unit 106b.

Figure 5A:
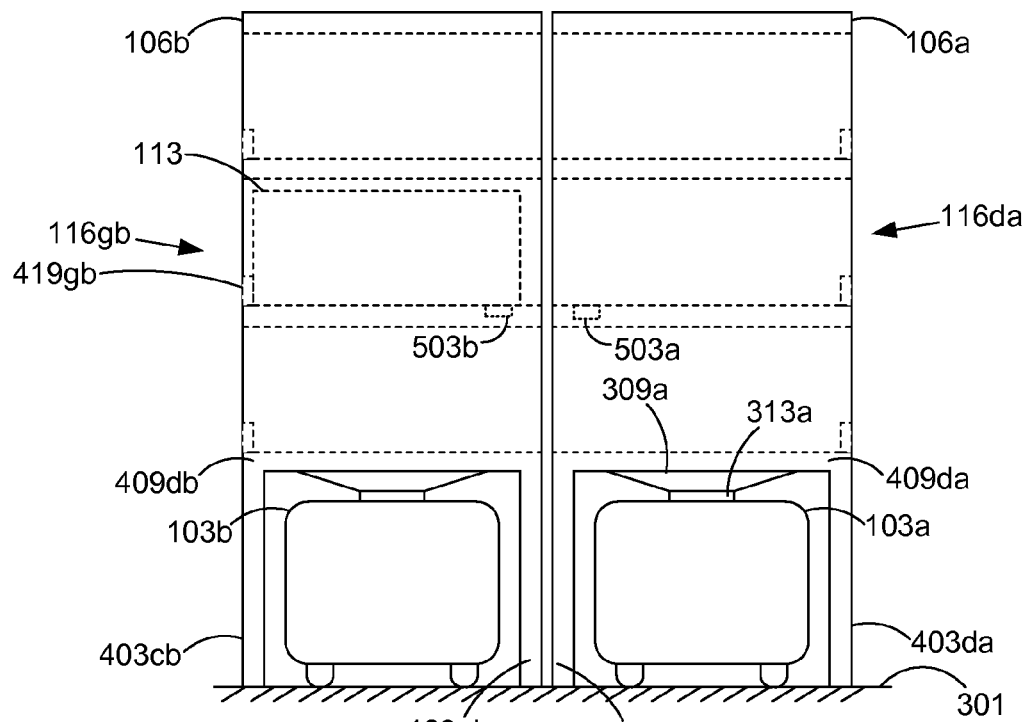
FIGS. 5A-5C are pictorial diagrams representing an example of a progression of a container being transferred from a target storage unit to a carrier storage unit according to various embodiments of the present disclosure.
Figure 5B:
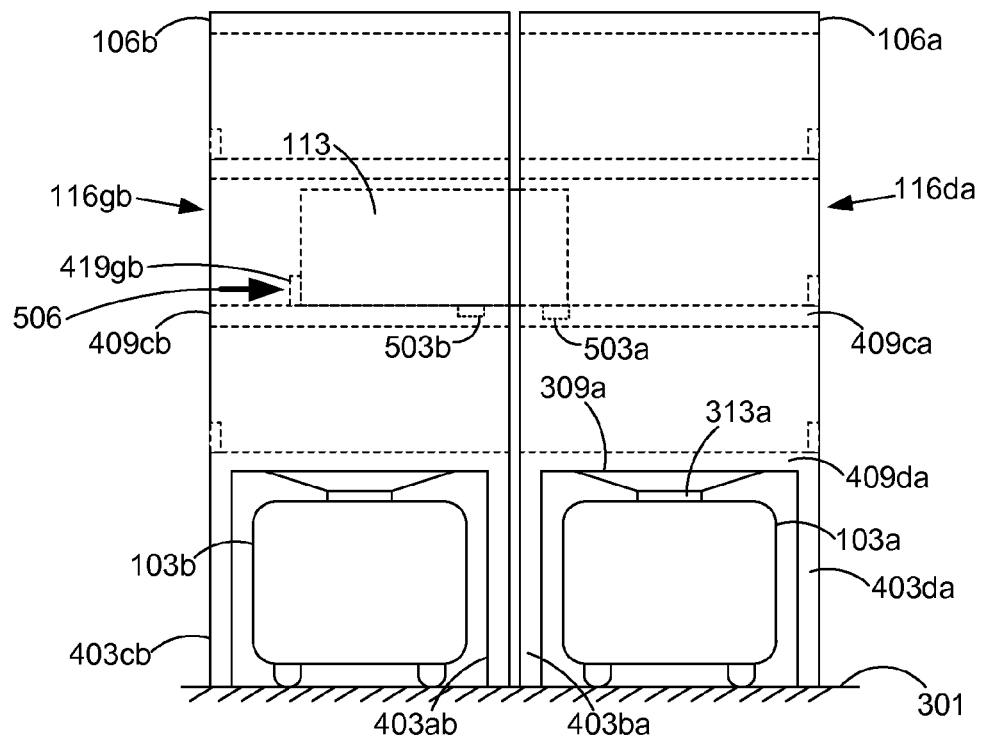
Figure 5C:
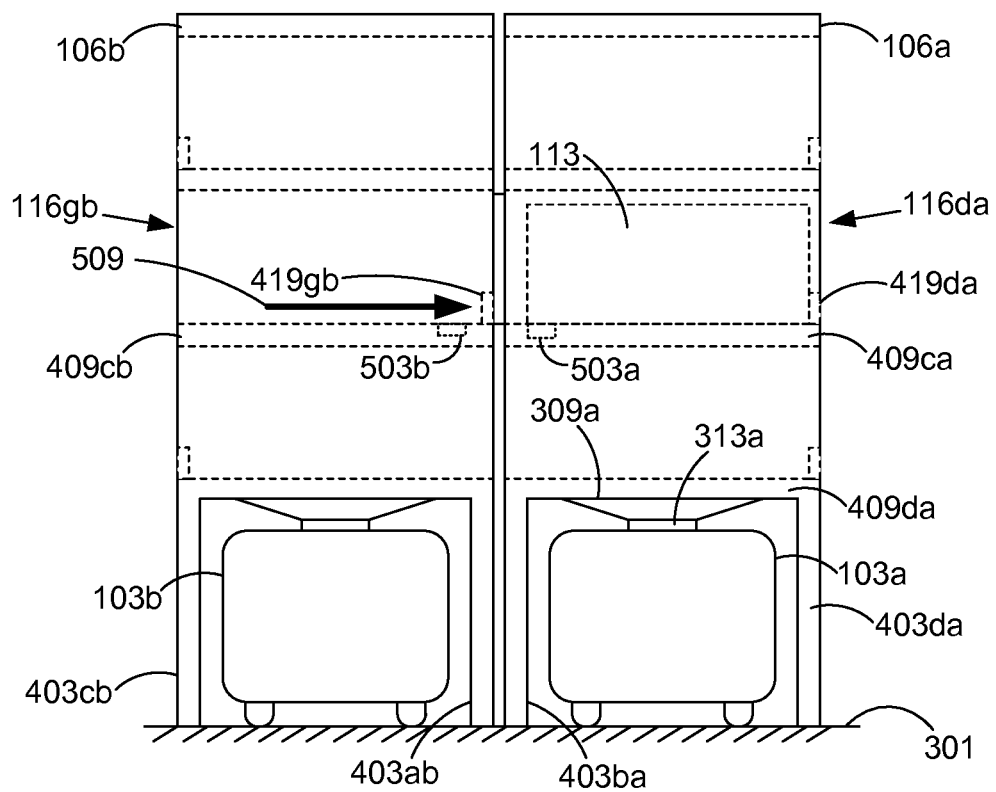

With reference to FIGS. 5A-5C, shown are drawings that represent an example of the progression of a container 113 being transferred from a target storage unit 106b to a carrier storage unit 106a. Beginning with FIG. 5A, shown is the carrier storage unit 106a after a robotic drive unit 103, referred to herein as the robotic drive unit 103a, has transported the carrier storage unit 106a to the target storage unit 106b. As shown, the robotic drive unit 103a is positioned under the shelf 409d, referred to herein as the shelf 409da, and between the legs 403a-403d, referred to herein as the legs 403aa-403da, of the carrier storage unit 106a. In this position, the robotic drive unit 103a may extend the elevator 313, referred to herein as the elevator 313a, upward to thereby push the platform 309, referred to herein as the platform 309a, upward. As a result, the carrier storage unit 106a is lifted off the floor 301. When the carrier storage unit 106a is lifted off the floor 301, the robotic drive unit 103a may travel across the floor 301 to transport the carrier storage unit 106a.

Additionally, another robotic drive unit 103, referred to herein as the robotic drive unit 103b, may be positioned under the shelf 409d, referred to herein as the shelf 409db, and between the legs 403a-403d, referred to herein as the legs 403ab-403db, of the target storage unit 106b as shown. The robotic drive unit 103b may lift and/or transport the target storage unit 106b in a similar manner as discussed above.

As shown in FIG. 5A, the container 113 is located in the receptacle 116g, referred to herein as the receptacle 116gb, of the target storage unit 106b. Additionally a side of the container 113 is contacting the container mover 419g, referred to herein as the container mover 419gb, in the target storage unit 106b.

The robotic drive unit 103a has moved the carrier storage unit 106a so the carrier storage unit 106a is proximate to the target storage unit 106b. Additionally, the empty receptacle 116d, referred to herein as the receptacle 116da, in the carrier storage unit 106a has been aligned with the container 113 in the receptacle 116gb of the target storage unit 106b. In this regard, the carrier storage unit 106a and the target storage unit 106b are positioned so that the container 113 can be transferred to the receptacle 116da in the carrier storage unit 106a.

In various embodiments, the carrier storage unit 106a and/or the target storage unit 106b may comprise one or more sensors 503a-503b that detect whether a container 113 is located in the receptacle 116gb and/or the receptacle 116da. For example, when the container 113 is in the position shown in FIG. 5A, the sensors 503a-503b may detect that the container 113 is located in the receptacle 116gb in the target storage unit 106b and not in the receptacle 116da in the carrier storage unit 106a. Such sensors may be embodied in the form of proximity sensors, pressure sensors, or any other type of sensor that can detect the container 113.

With reference to FIG. 5B, shown is the container 113 being transferred from the receptacle 116gb in the target storage unit 106b to the receptacle 116da in the carrier storage unit 106a. To this end, the container mover 419gb in the target storage unit 106b has moved with respect to the shelf 409c, referred to herein as the shelf 409cb, of the target storage unit 106b so that the container 113 is pushed towards the carrier storage unit 106a, as indicated by the arrow 506. As shown, a portion of the container 113 has slid onto the shelf 409c, referred to herein as the shelf 409ca, of the carrier storage unit 106a. When the container 113 is in the position shown in FIG. 5B, the sensors 503a-503b may detect that the container 113 is located in the receptacle 116gb in the target storage unit 106b and in the receptacle 116da in the carrier storage unit 106a.

With reference to FIG. 5C, shown is the container 113 after it has been transferred from the receptacle 116gb in the target storage unit 106b to the receptacle 116da in the carrier storage unit 106a. As shown, the container mover 419gb has moved across the shelf 409cb of the target storage unit 106b, as indicated by the arrow 509, to the position shown. As a result, the container 113 has been pushed out of the receptacle 116gb in the target storage unit 106b and into the receptacle 116da in the carrier storage unit 106a. Due to the momentum from being moved out of the receptacle 116gb, the container 113 may slide on the shelf 409ca in the carrier storage unit 106a until it makes contact with the container mover 419419d, referred to as the container mover 419da, in the carrier storage unit 106a, as shown in FIG. 5C. The container mover 419da in the carrier storage unit 106a may stop the container 113 within the receptacle 116da so that the container 113 is prevented from sliding off the carrier storage unit 106a.

When the container 113 is in the position shown in FIG. 5C, the sensors 503a-503b may detect that the container 113 is not in the receptacle 116gb of the target storage unit 106b and that the container 113 is located in the receptacle 116da in the carrier storage unit 106a. This information from the sensors 503a-503b may be transmitted to the computing environment 203 (FIG. 2) and/or the robotic drive unit 103a to inform the item retrieval application 229 (FIG. 2) that the container 113 has been transferred from the target storage unit 106b to the carrier storage unit 106a.

After the container 113 has been transferred to the receptacle 116da in the carrier storage unit 106a, the container 113 may be restricted from moving within the receptacle 116da in various ways. For example, the carrier storage unit 106a may comprise one or more doors that can be closed to restrict movement of the container 113 within the receptacle 116da of the carrier storage unit 106a. Additionally or alternatively, the shelf 409ca of the carrier storage unit 106a may comprise a latch within the receptacle 116da that is configured to engage the container 113 to thereby restrict movement of the container 113 with respect to the carrier storage unit 106a. As a result, the container 113 may be prevented from falling off the carrier storage unit 106a when the carrier storage unit 106a is being transported by the robotic drive unit 103a.

Figure 6:
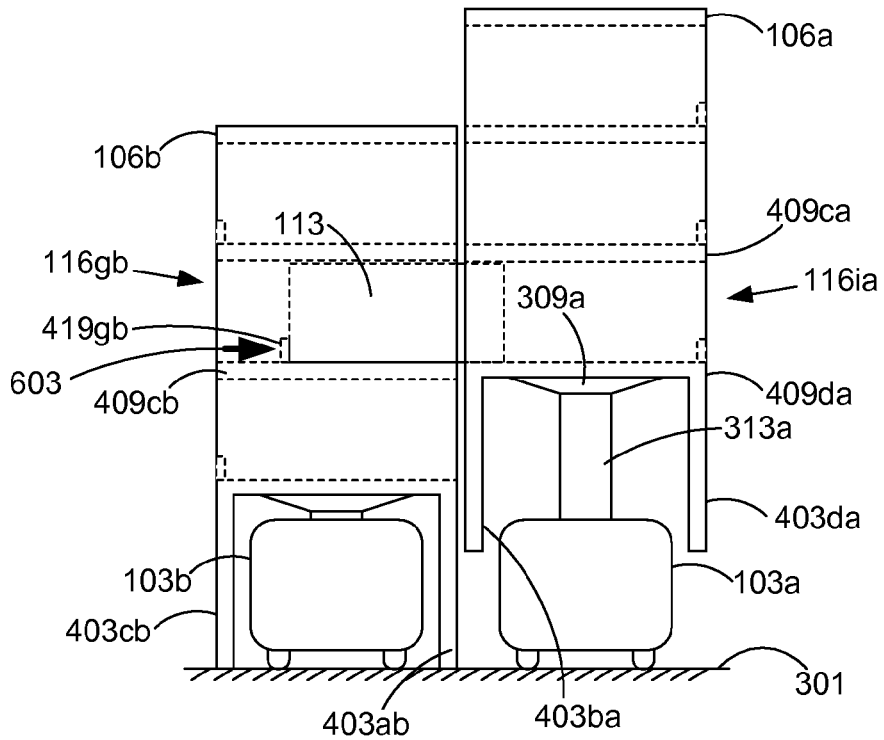
FIG. 6 is a pictorial diagram representing another example of a container being transferred from a target storage unit to a carrier storage unit according to various embodiments of the present disclosure.

With reference to FIG. 6, shown is another example of the container 113 being transferred from the target storage unit 106b to the carrier storage unit 106a. In particular, shown is the container 113 being transferred from the receptacle 116gb in the target storage unit 106b to the receptacle 116i, referred to herein as the receptacle 116ia, in the carrier storage unit 106a. When the target storage unit 106b and the carrier storage unit 106a are on the floor 301, the receptacle 116gb in the target storage unit 106b is not aligned with the receptacle 116ia in the carrier storage unit 106a. As such, in the embodiment shown in FIG. 6, the robotic drive unit 103a has extended the elevator 313a to thereby raise the platform 309a with respect to the floor 301. As a result, the carrier storage unit 106a has been raised with respect to the floor 301 so that the receptacle 116ia in the carrier storage unit 106a is aligned with the receptacle 116gb in the target storage unit 106b.

As shown in FIG. 6, the container mover 419gb for the receptacle 116gb has been moved with respect to the shelf 409cb, as indicated by the arrow 603. As a result, the container mover 419gb has pushed a portion of the container 113 into the receptacle 116ia in the carrier storage unit 106a. The container mover 419gb may continue to move in the direction indicated by the arrow 603 to thereby push the entire container 113 out of the receptacle 116gb in the target storage unit 106b so that it slides on the shelf 409da into the receptacle 116ia in the carrier storage unit 106a.

Figure 7:
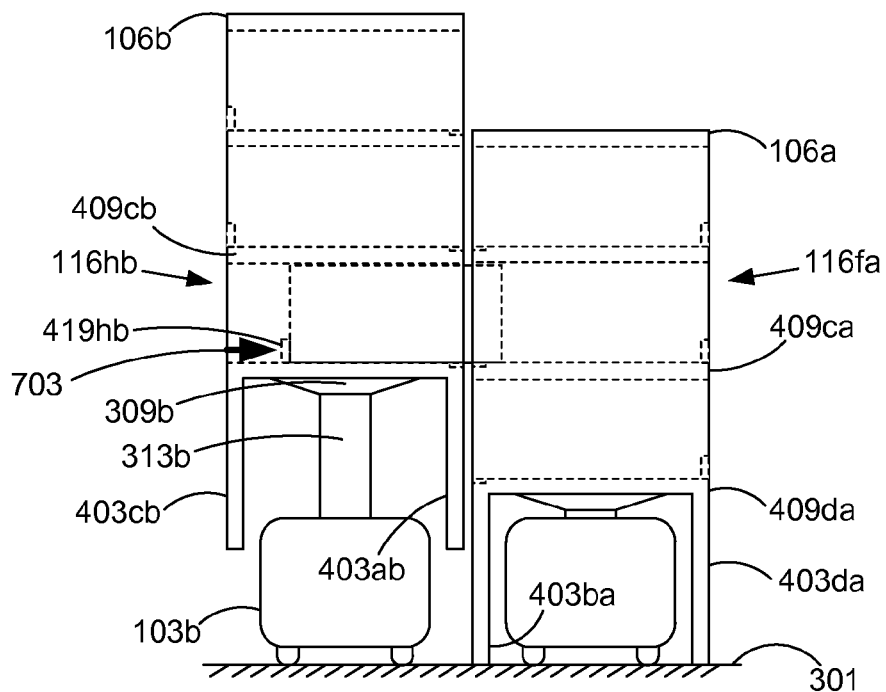
FIG. 7 is a pictorial diagram representing another example of a container being transferred from a target storage unit to a carrier storage unit according to various embodiments of the present disclosure.

With reference to FIG. 7, shown is another example of the container 113 being transferred from the target storage unit 106b to the carrier storage unit 106a. In particular, shown is the container 113 being transferred from the receptacle 116h, referred to herein as the receptacle 116hb, in the target storage unit 106b to the receptacle 116f, referred to herein as the receptacle 116fa, in the carrier storage unit 106a. When the target storage unit 106b and the carrier storage unit 106a are on the floor 301, the receptacle 116hb in the target storage unit 106b is not aligned with the receptacle 116fa in the carrier storage unit 106a. As such, in the embodiment shown in FIG. 7, the robotic drive unit 103b has extended the elevator 313, referred to herein as the elevator 313b to thereby raise the platform 309, referred to herein as the platform 309b, with respect to the floor 301. As a result, the target storage unit 106b has been raised with respect to the floor 301 so that the receptacle 116hb in the target storage unit 106b is aligned with the receptacle 116ia in the carrier storage unit 106a.

As shown in FIG. 7, the container mover 419h, referred to herein as the container mover 419hb, for the receptacle 116hb has been moved towards the carrier storage unit 106a, as indicated by the arrow 703. As a result, the container mover 419hb has pushed a portion of the container 113 into the receptacle 116fa in the carrier storage unit 106a. The container mover 419hb may continue to move in the direction indicated by the arrow 703 to thereby push the entire container 113 out of the receptacle 116hb in the target storage unit 106b so that the container 113 slides on the shelf 409ca into the receptacle 116fa in the carrier storage unit 106a.

Figure 8:
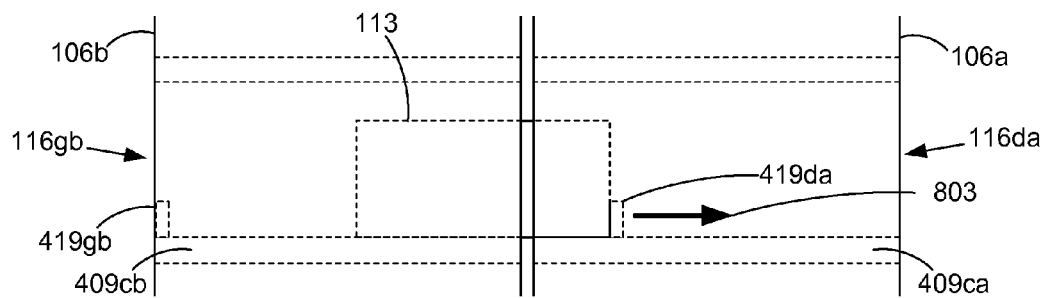
FIG. 8 is a pictorial diagram representing another example of a container being transferred from a target storage unit to a carrier storage unit according to various embodiments of the present disclosure.

With reference to FIG. 8, shown is another example of the container 113 being transferred from the target storage unit 106b to the carrier storage unit 106a. In particular, shown is the container 113 being transferred from the receptacle 116gb in the target storage unit 106b to the receptacle 116da in the carrier storage unit 106a. For the embodiment shown in FIG. 8, the container mover 419d, referred to herein as the container mover 419da, in the carrier storage unit 106a is configured to pull the container 113 into the receptacle 116da. To this end, the container mover 419da may be configured to attach to the container 113. For example, the container mover 419da may comprise a magnetic component, and the container 113 may comprise a ferromagnetic component that is attracted to the magnetic component and that facilitates the container 113 being attached to the container mover 419da. Alternatively or additionally, the container 113 may comprise a magnetic component, and the container mover 419da may comprise a ferromagnetic component that is attracted to the magnetic component and that facilitates the container 113 being attached to the container mover 419da. In alternative embodiments, the container mover 419da may comprise a suction element that facilitates attachment of the container mover 419da to the container 113. Alternatively, the container mover 419da may employ a latch that secures the container 113 to the container mover 419da when the latch is engaged.

As shown in FIG. 8, the container mover 419da for the receptacle 116da has been moved with respect to the shelf 409ca, as indicated by the arrow 803. As a result, the container mover 419da has pulled a portion of the container 113 into the receptacle 116da. The container mover 419da may continue to move in the direction indicated by the arrow 803 to thereby pull the entire container 113 out of the receptacle 116gb so that is slides on the shelf 409ca and into the receptacle 116da.

Figure 9:
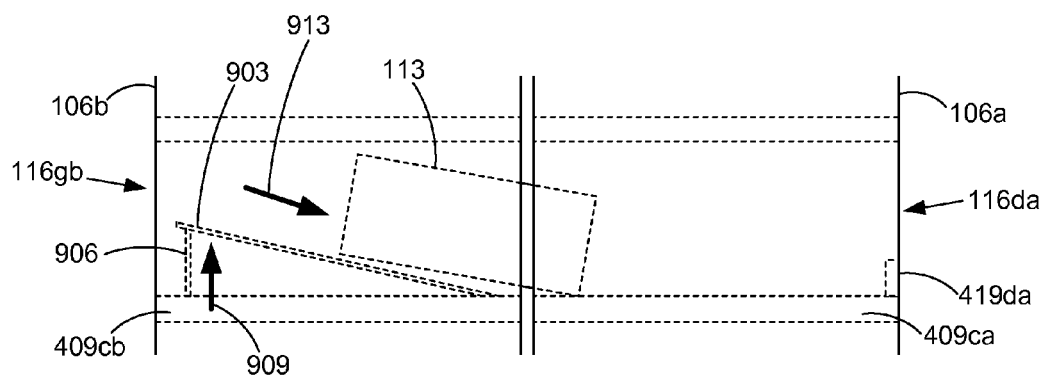
FIG. 9 is a pictorial diagram representing another example of a container being transferred from a target storage unit to a carrier storage unit according to various embodiments of the present disclosure.

With reference to FIG. 9, shown is another example of the container 113 being transferred from the target storage unit 106b to the carrier storage unit 106a. In particular, shown is the container 113 being transferred from the receptacle 116gb in the target storage unit 106b to the receptacle 116da in the carrier storage unit 106a. For the embodiment shown in FIG. 9, the receptacle 116gb does not comprise a container mover 419gb. Instead, the receptacle 116gb comprises a tiltable floor 903 that is configured to be tilted by a rod 906. The tiltable floor 903 may be configured to pivot about the end of the tiltable floor 903 that is distal to the rod 906, and the end of the tiltable floor 903 that is proximal to the rod 906 is configured to be raised and lowered with respect to the shelf 409cb. The rod 906 is configured to move vertically with respect to the shelf 409cb to adjust the tilting angle for the tiltable floor 903. To this end, the rod 906 may be coupled to, for example, a motor or actuator that causes the rod 906 to be moved.

As shown in FIG. 9, the rod 906 has been moved vertically upward with respect to the shelf 409cb, as indicated by the arrow 909. As a result, the tiltable floor 903 has been tilted. In this regard, the end of the tiltable floor 903 proximate to the rod 906 has been raised vertically, and the tiltable floor 903 has pivoted about the end of the tiltable floor 903 that is distal to the rod 906. In turn, gravity may cause the container 113 to slide along the tiltable floor 903 and into the receptacle 116da in the carrier storage unit 106a in the direction as indicated by arrow 913. The container 113 may slide along the shelf 409ca in the receptacle 116da until the container 113 makes contact with and is stopped by the container mover 419da.

Figure 10:
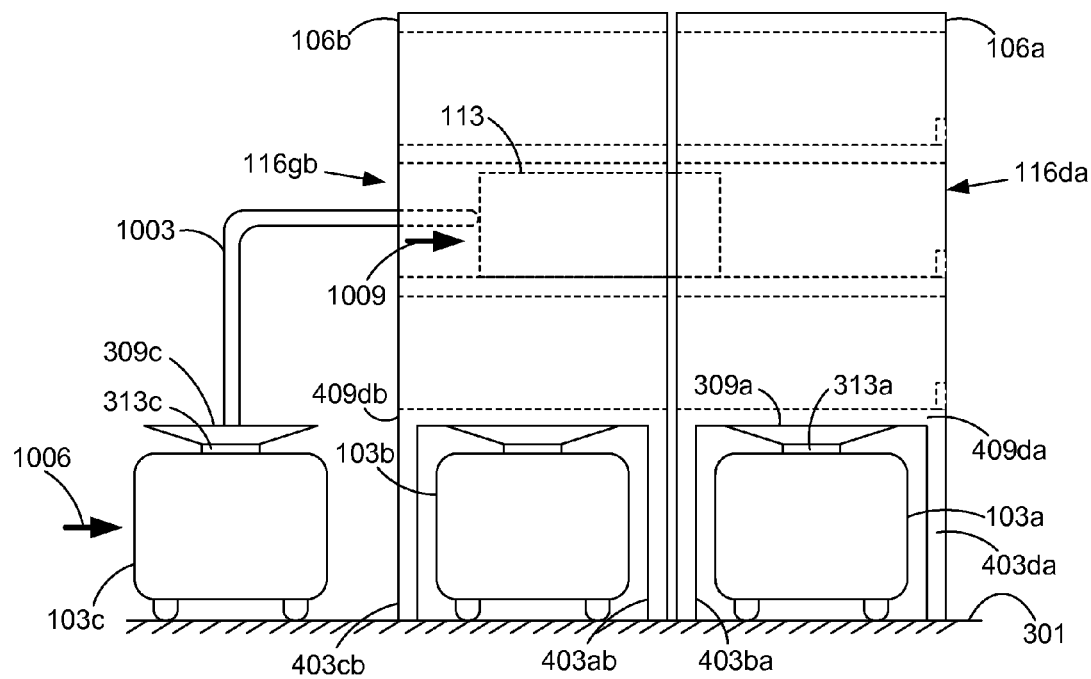
FIG. 10 is a pictorial diagram representing another example of a container being transferred from a target storage unit to a carrier storage unit according to various embodiments of the present disclosure.

With reference to FIG. 10, shown is another example of the container 113 being transferred from the target storage unit 106b to the carrier storage unit 106a. In particular, shown is another robotic drive unit 103, referred to herein as the robotic drive unit 103c, causing the container 113 to be transferred from the receptacle 116gb in the target storage unit 106b to the receptacle 116da in the carrier storage unit 106a.

The robotic drive unit 103c in the embodiment shown in FIG. 10 may be attached to an arm 1003. The arm 1003 may be attached to, for example, the platform 309, referred to herein as the platform 309c, as shown. As such, the robotic drive unit 103c may move with respect to the floor 301 to move the arm 1003 horizontally. In addition, the robotic drive unit 103c may raise or lower the elevator 313, referred to herein as the elevator 313c, in order to move the arm 1003 vertically.

The arm 1003 may be configured to contact the container 113 and to move the container 113 out of the receptacle 116gb and into the receptacle 116da. To this end, the robotic drive unit 103c may adjust the position of the arm 1003 so that the arm 1003 has been inserted into the receptacle 116gb. Thereafter, the robotic drive unit 103c may move in the direction indicated by the arrow 1006. As a result, the arm 1003 moves further into the receptacle 116gb and pushes the container 113 in the direction indicated by the arrow 1009. The robotic drive unit 103c may then continue to move in the direction indicated by the arrow 1006 to push the entire container 113 into the receptacle 116da. Thus, the robotic drive unit 103c may transfer the container 113 from the receptacle 116gb in the target storage unit 106b to the receptacle 116da in the carrier storage unit 106a.

Figure 11:
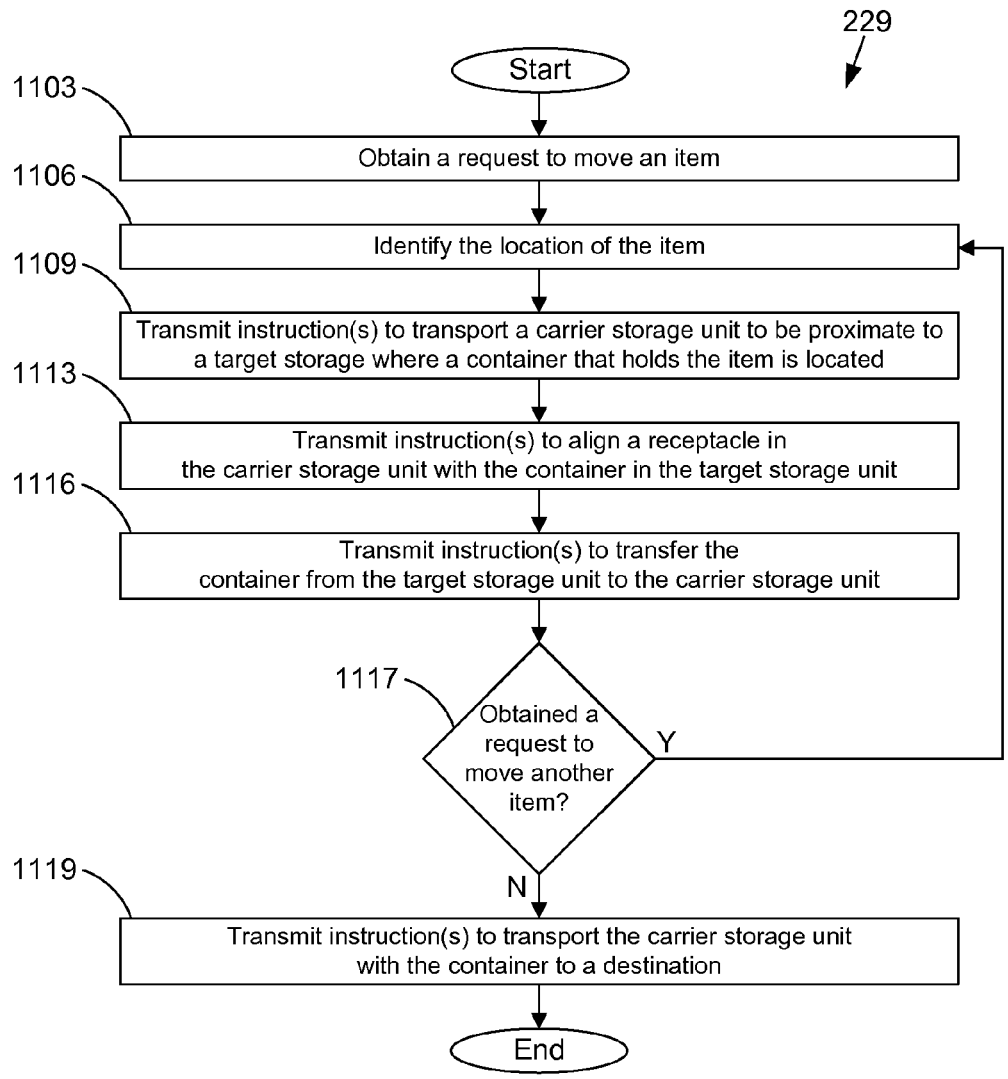
FIG. 11 is a flowchart illustrating an example of functionality implemented as at least a portion of an item retrieval application executed in a computing environment in the networked environment of FIG. 1 according to various embodiments of the present disclosure.

With reference to FIG. 11, shown is a flowchart that provides an example of the operation of a portion of the item retrieval application 229 according to various embodiments. In particular, the flowchart of FIG. 11 provides an example of the item retrieval application 229 transmitting instructions 236 (FIG. 2) to cause a container 113 (FIG. 1) to be transferred from a target storage unit 106b (FIG. 1) to a carrier storage unit 106a (FIG. 1). It is understood that the flowchart of FIG. 11 provides merely an example of the many different types of functional arrangements that may be employed to implement the operation of the portion of the item retrieval application 229 as described herein. As an alternative, the flowchart of FIG. 11 may be viewed as depicting an example of elements of a method implemented in the computing environment 203 (FIG. 2) according to one or more embodiments.

Beginning with box 1103, the item retrieval application 229 obtains a request to move an item 109 (FIG. 1). For example, the request to obtain the item 113 may be made in response to a customer interacting with an electronic commerce system to place an order to purchase the item 109. Next, the item retrieval application 229 identifies the location of the item 109, as indicated at box 1106. For instance, the item retrieval application 229 may identify the particular target storage unit 106b among other target storage units 106b where the item 109 is stored. Additionally, the item retrieval application 229 may identify the particular receptacle 116 (FIG. 1) within the identified target storage unit 106b where the container 113 holding the item 109 is located.

As shown at box 1109, the item retrieval application 229 transmits one or more instructions 236 for a robotic drive unit 103 (FIG. 1) to move a carrier storage unit 106a so that the carrier storage unit 106a is proximate to the target storage unit 106b where the requested item 109 is located. The item retrieval application 229 then transmits one or more instructions 236 for the robotic drive unit 103 to align a receptacle 116 in the carrier storage unit 106a with the container 113 in the target storage unit 106b that holds the requested item 109, as indicated at box 1113. For example, the robotic drive unit 103 may adjust the vertical and/or horizontal position of the carrier storage unit 106a. Additionally or alternatively, another robotic drive unit 103 may adjust the vertical and/or horizontal position of the target storage unit 106b.

As shown at box 1116, the item retrieval application 229 then transmits one or more instructions 236 to cause the container 113 to be transferred from the target storage unit 106b to the carrier storage unit 106a. For example, one or more container movers 419 (FIG. 4) in the target storage unit 106b and/or the carrier storage unit 106a may push and/or pull the container 113 from the receptacle 116 in the target storage unit 106b to the receptacle 116 in the carrier storage unit 106a. In alternative embodiments, an arm 1003 (FIG. 10) attached to another robotic drive unit 103 may be used to transfer the container 113 to the carrier storage unit 106a.

At box 1117, the item retrieval application 229 determines whether it has obtained another request to move another item 109 that may be located in another container 113 in another target storage unit 106b. For example, another item 109 may have been purchased in the same transaction as the item 109 that has already been retrieved, or another customer may have placed an order for the other item 109. If a request has been received, the item retrieval application 229 moves to box 1106 and identifies the location of the item 109. Thereafter, the boxes 1109-1117 may be repeated as shown. In some embodiments, the boxes 1106-117 may be repeated a predetermined number of times. For instance, the process of transferring containers 113 into receptacles 116 in the carrier storage unit 106a may be repeated until all of the receptacles 116 in the carrier storage unit 106a are occupied with a respective container 113.

If, at box 1117, the item retrieval application 229 determines that it has not received another request to move another item 109, the item retrieval application 229 may then transmit one or more instructions 236 for the robotic drive unit 103 to transport the carrier storage unit 106a with the one or more containers 113 to a particular destination, as shown at box 1119. For example, the destination may be another target storage unit 106b, a shipping preparation station, or any other location. Thereafter, the process ends.

Figure 12:
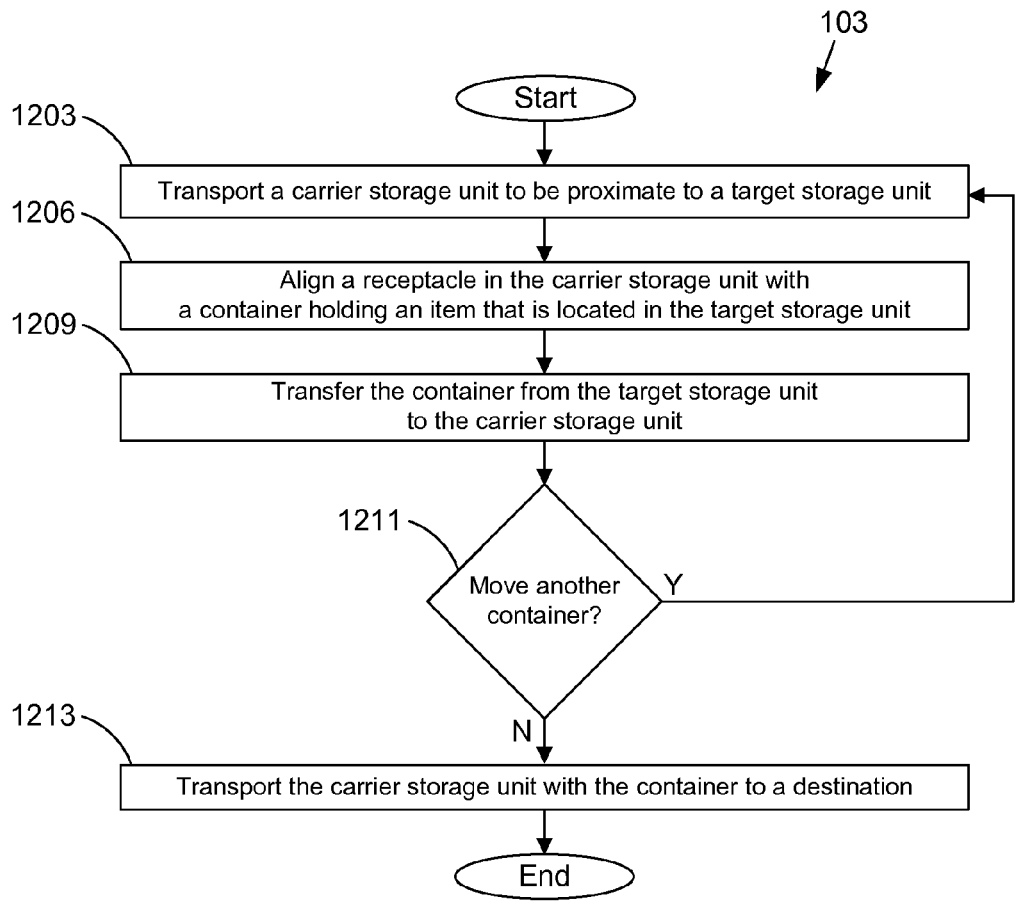
FIG. 12 is a flowchart illustrating an example of functionality performed by a robotic drive unit according to various embodiments of the present disclosure.

With reference to FIG. 12, shown is a flowchart that provides an example of the operation of a portion of a robotic drive unit 103 according to various embodiments. It is understood that the flowchart of FIG. 12 provides merely an example of the many different types of functional arrangements that may be employed to implement the operation of the portion of the robotic drive unit 103 as described herein.

Beginning at box 1203, the robotic drive unit 103 transports a carrier storage unit 106a (FIG. 1) so that the carrier storage unit 106a is proximate to a target storage unit 106b (FIG. 1). For example, the robotic drive unit 103 may position itself under a portion of the carrier storage unit 106a and carry the carrier storage unit 106a to the target storage unit 106b. As shown at box 1206, the robotic drive unit 103 aligns a receptacle 116 (FIG. 1) in the carrier storage unit 106a with a container 113 (FIG. 1) holding an item 109 (FIG. 1) that is located in the target storage unit 106b. For example, the robotic drive unit 103 may adjust the vertical and/or horizontal position of the carrier storage unit 106a.

Next, the container 113 is transferred from the target storage unit 106b to the carrier storage unit 106a, as indicated at box 1209. For example, the container 113 may be pushed or pulled from the target storage unit 106b to the receptacle 116 in the carrier storage unit 106a. In various embodiments, the carrier storage unit 106a and/or the target storage unit 106b may comprise a conveyor (e.g., in a receptacle 116) that facilitates the transfer of the container 113 from the target storage unit 106b to the carrier storage unit 106a.

At box 1211, it is decided whether the robotic drive unit 103 is to move another container 113 that may be located, for example, in another target storage unit 106b. If so, the robotic drive unit 103 returns to box 1203 and transports the carrier storage unit 106a to be proximate to the target storage unit 106b where the other container is located. Thereafter, boxes 1206-1211 may be repeated as shown. In some embodiments, the process may be repeated a predetermined number of times. For instance, the process of transferring containers 113 into receptacles 116 in the carrier storage unit 106a may be repeated until all the receptacles 116 in the carrier storage unit 106a are occupied with a respective container 113.

If, at box 1211, it is determined that there are no other containers 113 to be moved, the robotic drive unit 103 transports the carrier storage unit 106a with the one or more containers 113 to a destination, as shown at box 1213. For example, the destination may be another target storage unit 106b, a shipping preparation station in an order fulfillment center, or any other location. Thereafter, the process ends.

Figure 13:
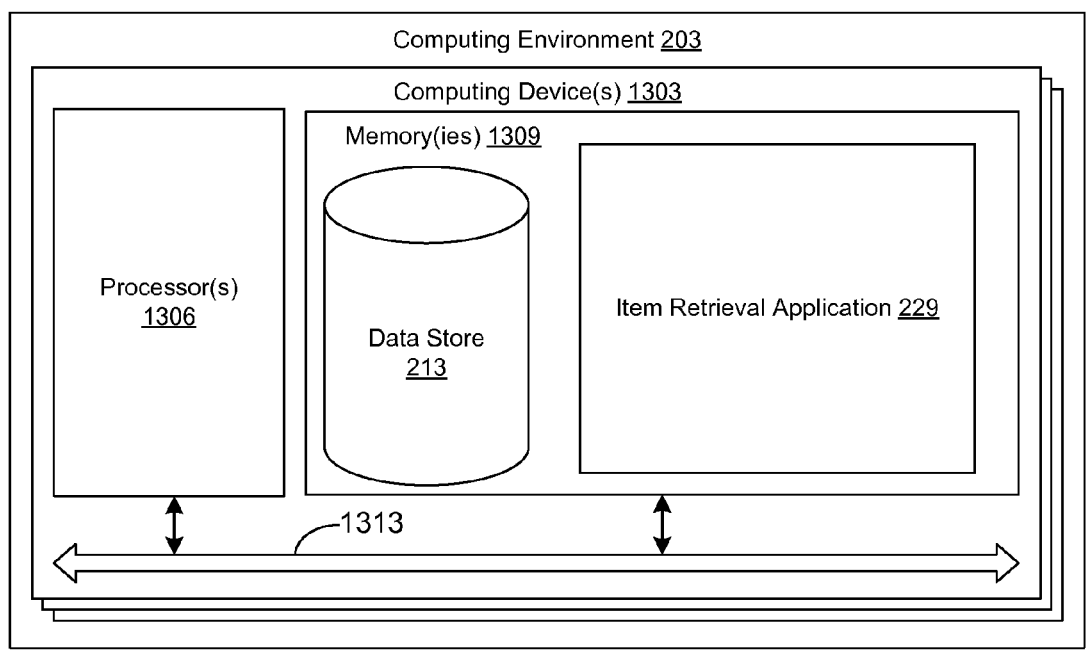
FIG. 13 is a schematic block diagram that provides one example illustration of a computing environment employed in the networked environment of FIG. 1 according to various embodiments of the present disclosure.

With reference to FIG. 13, shown is a schematic block diagram of the computing environment 203 according to an embodiment of the present disclosure. The computing environment 203 includes one or more computing devices 1303. Each computing device 1303 includes at least one processor circuit, for example, having a processor 1306 and a memory 1309, both of which are coupled to a local interface 1313. To this end, each computing device 1303 may comprise, for example, at least one server computer or like device. The local interface 1313 may comprise, for example, a data bus with an accompanying address/control bus or other bus structure as can be appreciated.

Stored in the memory 1309 are both data and several components that are executable by the processor 1306. In particular, stored in the memory 1309 and executable by the processor 1306 is the item retrieval application 229 and potentially other applications. Also stored in the memory 1309 may be the data store 213 and other data. In addition, an operating system may be stored in the memory 1309 and executable by the processor 1306.

It is understood that there may be other applications that are stored in the memory 1309 and are executable by the processor 1306 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 1309 and are executable by the processor 1306. In this respect, the term "executable" means a program file that is in a form that can ultimately be run by the processor 1306. Examples of executable programs may be, for example, a compiled program that can be translated into machine code in a format that can be loaded into a random access portion of the memory 1309 and run by the processor 1306, source code that may be expressed in proper format such as object code that is capable of being loaded into a random access portion of the memory 1309 and executed by the processor 1306, or source code that may be interpreted by another executable program to generate instructions in a random access portion of the memory 1309 to be executed by the processor 1306, etc. An executable program may be stored in any portion or component of the memory 1309 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1309 is defined herein as including both volatile and nonvolatile memory and data storage components. Volatile components are those that do not retain data values upon loss of power. Nonvolatile components are those that retain data upon a loss of power. Thus, the memory 1309 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1306 may represent multiple processors 1306 and/or multiple processor cores and the memory 1309 may represent multiple memories 1309 that operate in parallel processing circuits, respectively. In such a case, the local interface 1313 may be an appropriate network that facilitates communication between any two of the multiple processors 1306, between any processor 1306 and any of the memories 1309, or between any two of the memories 1309, etc. The local interface 1313 may comprise additional systems designed to coordinate this communication, including, for example, performing load balancing. The processor 1306 may be of electrical or of some other available construction.

Although the item retrieval application 229 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 11 and 12 show the functionality and operation of an implementation of portions of the item retrieval application 229 and the robotic drive unit 103, respectively. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 1306 in a computer system or other system. The machine code may be converted from the source code, etc. If embodied in hardware, each block may represent a circuit or a number of interconnected circuits to implement the specified logical function(s).

Although the flowcharts of FIGS. 11 and 12 show a specific order of execution, it is understood that the order of execution may differ from that which is depicted. For example, the order of execution of two or more blocks may be scrambled relative to the order shown. Also, two or more blocks shown in succession in FIGS. 11 and 12 may be executed concurrently or with partial concurrence. Further, in some embodiments, one or more of the blocks shown in FIGS. 11 and 12 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the item retrieval application 229, that comprises software or code can be embodied in any non-transitory computer-readable medium for use by or in connection with an instruction execution system such as, for example, a processor 1306 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the item retrieval application 229, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 1303, or in multiple computing devices 1303 in the same computing environment 203. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It is emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
   a carrier rack comprising at least two receptacles;
   a robotic drive unit configured to transport the carrier rack;
   at least one target rack comprising a first item located in a first container and a second item located in a second container; and
   at least one computing device configured perform a method comprising:
   determining, via the at least one computing device, a travel path for the robotic drive unit to travel to the at least one target rack;
   causing, via the at least one computing device, the robotic drive unit to transport the carrier rack along the travel path to be proximate to the at least one target rack;
   causing, via the at least one computing device, the robotic drive unit to align a first receptacle of the at least two receptacles with the first container;
   initiating, via the at least one computing device, a first transfer of the first container to the first receptacle in the carrier rack;
   causing, via the at least one computing device, the robotic drive unit to align a second receptacle of the at least two receptacles with the second container;
   initiating, via the at least one computing device, a second transfer of the second container to the second receptacle in the carrier rack; and
   causing, via the at least one computing device, the robotic drive unit to transport the carrier rack with the first container and the second container to a shipping preparation station.

2. The system of claim 1, wherein the at least one target rack further comprises a first target rack and a second target rack, the first container resides on the first target rack, the second container resides on the second target rack, and the method further comprises causing, via the at least one computing device, the robotic drive unit to transport the carrier rack to be proximate to the second target rack.

3. The system of claim 1, wherein the at least one target rack further comprises a plurality of container movers configured to push the first container into the first receptacle and the second container into the second receptacle in the carrier rack.

4. The system of claim 1, wherein the carrier rack comprises at least two container movers corresponding to the at least two receptacles, the at least two container movers being configured to pull the first container into the first receptacle and the second container into the second receptacle.

5. The system of claim 1, further comprising a second robotic drive unit comprising an arm configured to at least push or pull the first container into the first receptacle and the second container into the second receptacle.

6. A method, comprising:
   identifying, via a computing device, a location of an item in a container of a target storage unit;
   generating, via the computing device, instructions directing a robotic drive unit to transport a carrier storage unit to be proximate to the target storage unit;
   generating, via the computing device, instructions to align a receptacle in the carrier storage unit with the container in the target storage unit;
   generating, via the computing device, instructions to transfer the container to the receptacle; and
   generating, via the computing device, instructions directing the robotic drive unit to transport the carrier storage unit with the container to a destination.

7. The method of claim 6, wherein transmitting instructions to align the receptacle further comprises transmitting instructions directing the robotic drive unit to move the carrier storage unit vertically or horizontally with respect to a floor.

8. The method of claim 6, wherein transmitting instructions to align the receptacle further comprises transmitting instructions directing a second robotic drive unit to move the target storage unit vertically or horizontally with respect to a floor.

9. The method of claim 6, wherein transmitting instructions to transfer the container to the receptacle further comprises transmitting instructions directing a second robotic drive unit to utilize an arm to at least push or pull the container to the receptacle.

10. The method of claim 6, wherein transmitting instructions to transfer the container to the receptacle further comprises transmitting instructions to move a container mover in the target storage unit so that the container mover transfers the container to the receptacle.

11. The method of claim 6, wherein transmitting instructions to transfer the container to the receptacle further comprises transmitting instructions to move a container mover in the carrier storage unit so that the container mover transfers the container from the target storage unit to the receptacle.

12. The method of claim 6, further comprising:
   identifying, in the computing device, a container dimension of the container; and
   transmitting, in the computing device, instructions to adjust a receptacle dimension based at least in part on the container dimension prior to transmitting instructions to transfer the container to the receptacle.

13. The method of claim 6, further comprising receiving, via the computing device, an indication that the container has been transferred from the target storage unit to the receptacle.

14. The method of claim 6, further comprising receiving, via the computing device, an indication that the receptacle in the carrier storage unit is aligned with the container; and in response to receiving the indication, initiating, via the computing device, generating instructions to transfer the container to the receptacle.

15. A system, comprising:
   at least one computing device configured to perform a method comprising:
      instructing, via the at least one computing device, a robotic drive unit to transport a carrier storage unit to be proximate to a first target storage unit;
      instructing, via the at least one computing device, the robotic drive unit to align a first receptacle in the carrier storage unit with a first container in the first target storage unit;
      initiating, via the at least one computing device, transfer of the first container from the first target storage unit to the first receptacle in the carrier storage unit;
      instructing, via the at least one computing device, the robotic drive unit to transport the carrier storage unit to be proximate to a second target storage unit;
      instructing, via the at least one computing device, the robotic drive unit to align a second receptacle in the carrier storage unit with a second container in the second target storage unit;
      initiating, via the at least one computing device, transfer of the second container from the second target storage unit to the second receptacle in the carrier storage unit; and
      instructing, via the at least one computing device, the robotic drive unit to transport the carrier storage unit to a shipping preparation station where a first item in the first container and a second item in the second container are to be prepared for shipping.

16. The system of claim 15, wherein the method further comprises determining, via the at least one computing device, a travel path for the robotic drive unit to travel on to transport the carrier storage unit to be proximate to the first target storage unit based at least in part on a plurality of travel paths for a plurality of other robotic drive units.

17. The system of claim 15, wherein the method further comprises receiving, via the at least one computing device, a request to obtain the first item and the second item.

18. The system of claim 15, wherein the carrier storage unit comprises a plurality of container movers configured to pull the first container into the first receptacle and the second container into the second receptacle.

19. The system of claim 15, wherein the method further comprises:
   causing, via the at least one computing device, a first lock for the first receptacle to be engaged after transferring the first container to the first receptacle; and
   causing, via the at least one computing device, a second lock for the second receptacle to be engaged after transferring the second container to the second receptacle, wherein the first lock restricts movement of the first container and the second lock restricts movement of the second container.

20. The system of claim 15, wherein the method further comprises:
   identifying, via the at least one computing device, a container dimension of the first container; and
   transmitting, via the at least one computing device, instructions to adjust a receptacle dimension of the first receptacle in the carrier storage unit prior to initiating the transfer of the first container.

* * * * *